E. LEWIS.
FLY TRAP.
APPLICATION FILED DEC. 6, 1913.
1,202,542.
Patented Oct. 24, 1916.
2 SHEETS—SHEET 1.
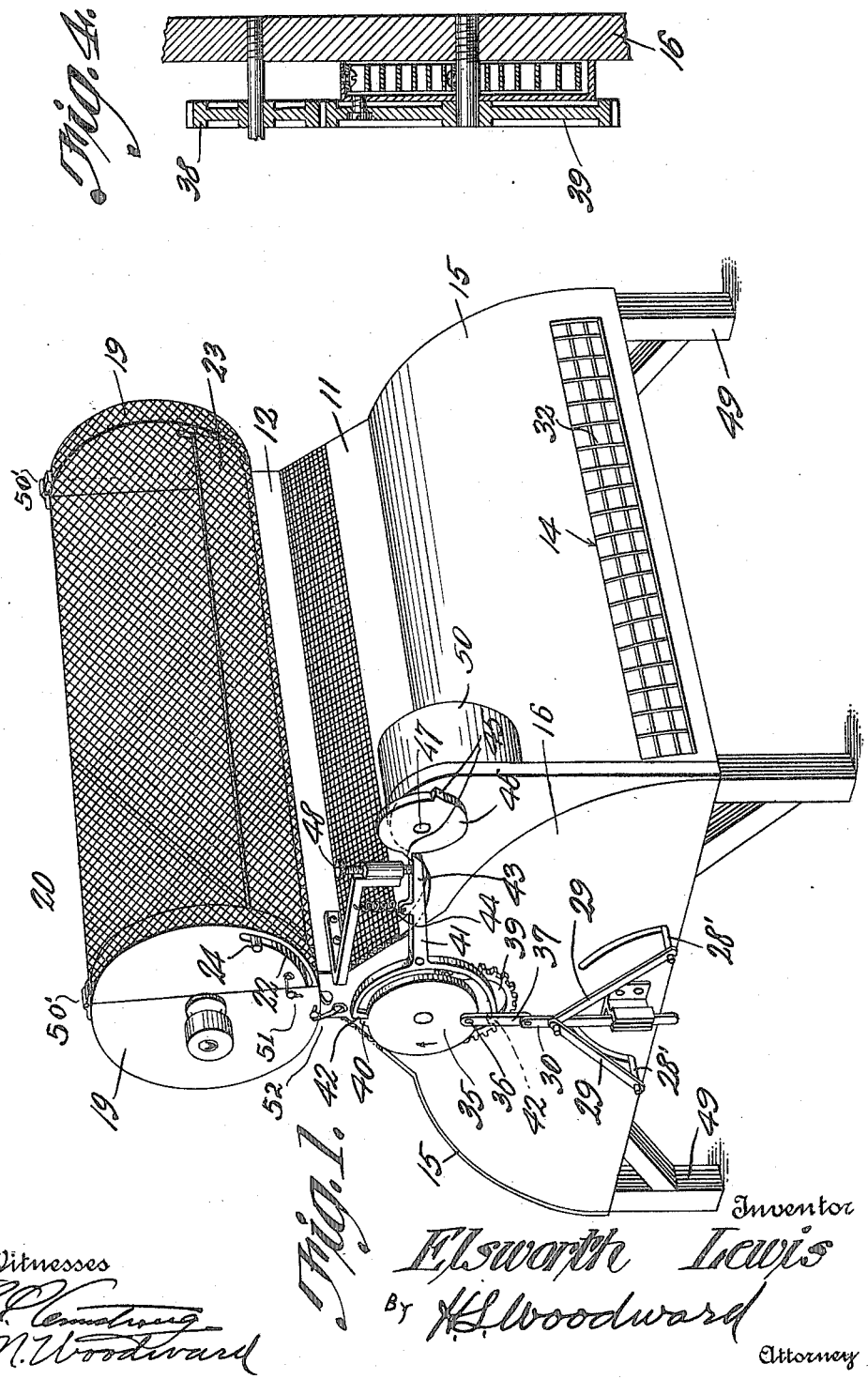

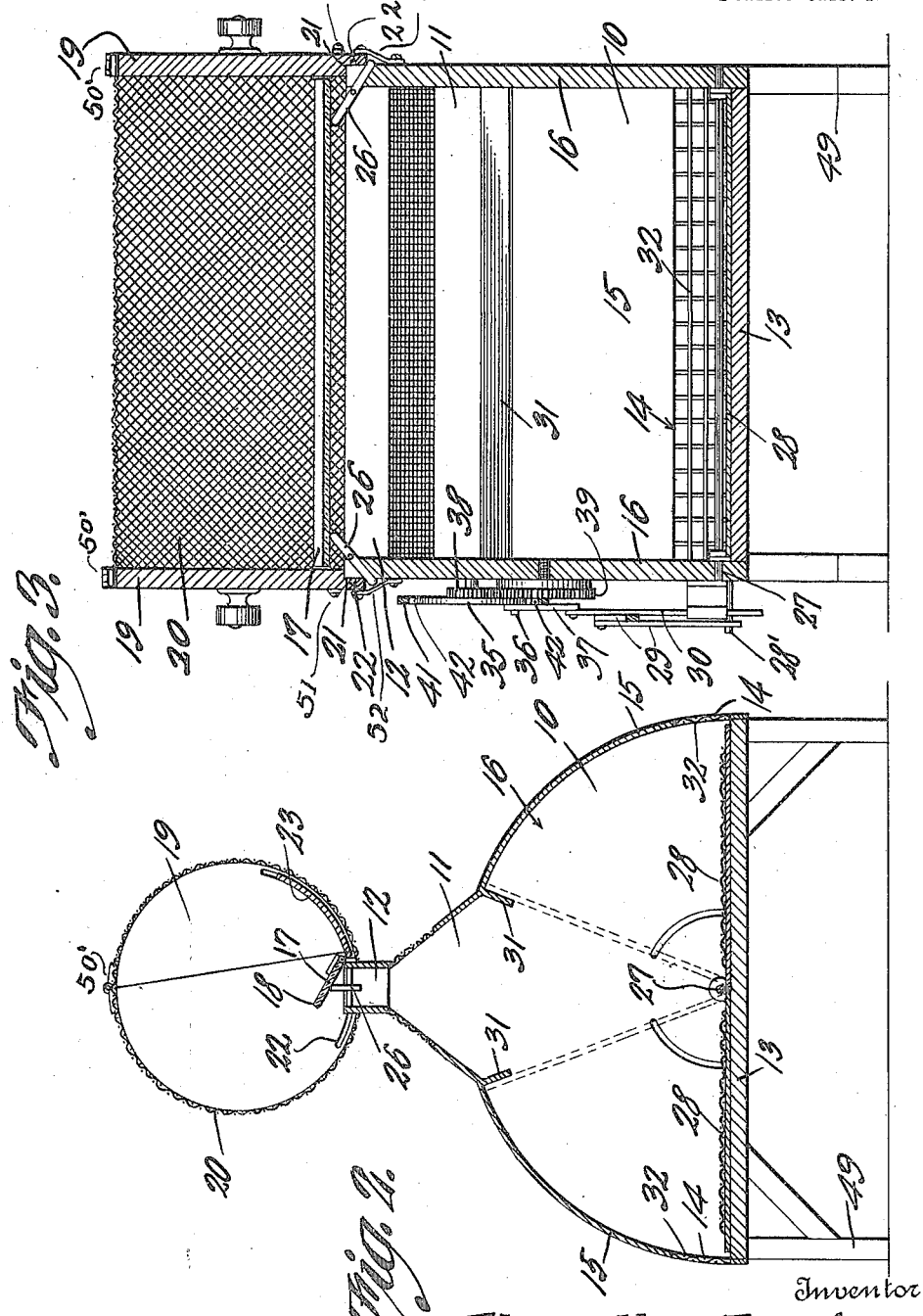

UNITED STATES PATENT OFFICE.

ELSWORTH LEWIS, OF SHREVE, OHIO.

FLY-TRAP.

1,202,542.  Specification of Letters Patent.  Patented Oct. 24, 1916.

Application filed December 6, 1913. Serial No. 805,010.

*To all whom it may concern:*

Be it known that I, ELSWORTH LEWIS, a citizen of the United States, residing at Shreve, in the county of Wayne and State of Ohio, have invented new and useful Improvements in Fly-Traps, of which the following is a specification.

The invention has for an object to enable the rapid and safe removal of a fly chamber from a large trap without liability of the escape of victims from the chamber, or from a lower heavy bait portion or base, and without requiring the manipulation of any fastenings or closure devices.

An important object is to give a novel bait section of improved character with a large capacity but occupying little space.

A further purpose is to present an improved mechanism for hastening the movement of flies from the bait chamber to the fly chamber or drum, in which the victims are removed.

It is another attainment of the invention that a simple and efficient means is provided for operating intermittently agitator devices to both brush and frighten the flies toward the drum.

It is also sought to enable the manufacture of such a trap at a low cost.

Additional objects and advantages will appear, some of which will appear from the following description and from the drawings in which—

Figure 1 is a perspective view of the trap, Fig. 2 is a cross sectional view, Fig. 3 is a fragmentary longitudinal sectional view thereof, Fig. 4 is a fragmentary vertical section of the operating mechanism.

There is illustrated a trap comprising a base chamber 10 formed by a suitable housing, principally of sheet iron, the chamber having a semicircular form in cross section with the exception that its top is extended slightly beyond the arc of the sides as at 11, forming a throat leading to a narrow neck 12 at the apex, extending throughout the length of the chamber. The chamber is provided with a solid floor 13, and the sides 15 stop short thereof to form a narrow entrance slot 14 extending for the full length of the trap. The throat portion 11 is preferably formed of a material to admit light, such as cloth, fine wire screen, or opalescent glass, the opacity of the sides 15 and illumination of the throat coöperating for a function to be explained. The ends 16 of the trap may be formed of any suitable material, and as illustrated consist of pieces of board cut to the proper shape, upon which the sides of the chamber and throat are fastened. The sides of the neck 12 are preferably opaque, and it is of rectilinear form with vertical sides. It is covered by a glass plate 17, one edge of which is raised as at 18 to allow passage of flies therefromunder to the drum 20, to be described. The drum 20 is of cylindrical form, consisting of two heads 19 at the ends with insets 21 in their lower sides adapted to fit snugly over the neck 12, the drum being slightly longer than the chamber 10 and the insets being formed on the inner sides of the heads, so that the drum will be supported thereby. The drum sides are formed of wire screen fastened to the heads and terminating at the sides of the notches so as to fit snugly against the sides of the neck when the drum is adjusted thereon. Concentric grooves 22 are formed on the inner sides of the heads 19 close to the screen sides, at the lower part of the drum and extending across the notches 21, and slidable in these there is a curved sliding door 23 having pins 24 projecting through reduced portions of the slots at each end of the drum door for its manipulation. The drum tends to fall into closed position under the action of gravity, so that when the drum is lifted from the bait chamber by means of the knobs 25 at each end, the door slides into closed position automatically. If desired, the plate 17 may be hinged at the side opposite the opening 18, and arranged to fall into closed position by gravity, being held open by the weight of the drum bearing down upon the small levers 26 pivoted at each end of the neck so that one end of each will be engaged by the adjacent head 19, the inner end of the lever bearing upwardly against the plate 17 and raising it when the drum is in place.

Concentric with the sides 15 there is a pivot shaft 27, upon which there are pivoted two wings 28, principally of screen material, and from each wing at one end of the chamber 10 there projects an operating pin 28', to which links 29 are respectively connected, the opposite ends of the links being joined pivotally to a reciprocating rod 30 mounted slidably on the end of the chamber 10, and operated intermittently in a manner to be described. The outer edges of the wings are arranged to swing close to the sides 15, and at the beginning of the throat 11 there are placed stops 31 to determine the inner limit of movement of the wings and hold them as shown dotted in Fig. 1. The wings may be covered with a fiber cloth instead of the wire screen, and beneath this there may be an opaque material. The construction is so shown.

The fabric may be covered with some material which will act as a bait, or a bait may be disposed in the chamber 10, or located adjacent the hinges of the wings in any familiar way.

The entrances 14 are covered with a very coarse wire netting 32 sufficiently large to admit flies and other insects but preventing the access of rodents, or objects that might obstruct operation of the trap.

Mounted revolubly on the end of the chamber 10 adjacent the rod 30 there is a disk 35 having a wrist 36 from which there extends a link 37 connected to the rod 30, the disk having a small gear 38 thereon meshed with a large spring operated gear 39, operated by any customary form of spring connections with, and winding of which spring may be accomplished by any suitable means ordinarily employed for the purpose, and not here illustrated. The disk has two radial teeth 40 diametrically opposed thereon, and an escapement lever 41 is pivoted thereadjacent having arms embracing the disk and having fingers 42 thereon the inner ends of which are spaced slightly more than the periphery at the base of one tooth and the outer end of the other tooth. Oscillation of the lever will allow intermittent rotation of the disk, in the way well understood. The lever has a primary arm 43, engaged by a spring 44 tending to hold it at one limit of its oscillatory movement, the arm projecting some distance past the spring, its end being disposed in the path of teeth 45 on a member 46 carried by the hour shaft 47 of a clock mechanism or the like, the disk rotating to move the arm 43 against action of the spring 44. A stop screw 48 is mounted on the end of the chamber 10 to limit movement of the lever toward the spring. The shaft 47 should make about one revolution per hour, possibly more or less.

In practice the best results have been attained by not operating the wings 28, as indicated.

The complete device is supported by legs 49 of suitable form.

In operation, the trap being properly baited, it is set in a suitable situation and the flies will quickly gather on the wings. A great many will leave the bait chamber quickly under natural impulse and pass into the drum 20 from which they will be unable to find their way out. But the tendency is for a great many to remain on the bait, thus crowding others away and lessening the capacity of the trap for trapping, the flies, even though they cluster thickly about. Suddenly, however, the two sides of the floor spring upwardly jarring the flies from the bait when the stops 31 check the movement of the wings abruptly, and causing a great commotion and fright among the flies. The wings having closed off the light from the entrances, and the sides 15 being dark the flies will be attracted to the illuminated throat, from whence they will struggle to the light at the upper end of the neck 12 and out from under the plate 17 into the drum 20. The semi-illumination coming through the screen at the upper part of the throat will at all times lead the flies upwardly toward the neck and cause them to pass more rapidly in that direction, by reason of the fact that when they are in the lower part of the chamber the top of the neck is some distance away, and intervening flies may obscure its light.

It is an important advantage of this trap that the construction is such that it will rapidly trap flies without the operation of the wings by the clock and spring mechanism, and therefore should the winding of the springs be overlooked the trap does not become inoperative. In fact, it will operate as a stationary device much better than many prior devices.

The removal of the drum will be understood from the foregoing description. In its replacement, the projecting pins 24 on each end of the door 23 are pressed upwardly by the fingers of the operator, while the insets 21 in the heads 19 are adjusted on the neck 12.

The drum may be made in two sections hinged at 50', and secured in closed position by a fastening 51. This permits access to the interior for thorough cleaning. The drum may also be held in place upon the neck 12 by means of a fastening at 52.

I do not regard the scope of my invention as limited to the particular embodiment shown, as it is obviously possible to modify it in many particulars within the scope of my claims.

What is claimed:

1. In a trap a bait chamber having oscillatable elements therein, a rotating disk having opposed teeth, operative connections between the disk and the oscillatable elements for the purpose described, an escapement lever engaged therewith, eccentric connections between the disk and the oscillatable elements, means tending to rotate the disk, and means to operate the lever intermittently.

2. In a mechanical insect trap of the character described, a horizontal bait chamber housing having substantially semi-cylindrical side walls having an exit centrally at its upper part and having low longitudinal ingress openings at each side, said housing having vertical walls at each end, vanes pivoted concentrically of the housing of a form to lie below and adjacent respective ingress openings and to swing upwardly within the housing said vanes being shaped and proportioned to lie close to respective side walls and the end walls, means to oscillate the vanes simultaneously and means to limit inward movement thereof immediately adjacent said exit, whereby the bait chamber will be closed and cleared of insects by the vanes intermittently.

In testimony whereof I have hereunto set my hand in presence of two subscribing witnesses.

ELSWORTH LEWIS.

Witnesses:
JOHN DRUELLER,
DON LAWRENCE.

Copies of this patent may be obtained for five cents each, by addressing the "Commissioner of Patents, Washington, D. C."